July 5, 1932.   J. R. McWANE   1,866,051
METHOD OF AND APPARATUS FOR ASSEMBLING PIPE JOINT ELEMENTS
Filed Feb. 11, 1927   3 Sheets-Sheet 1
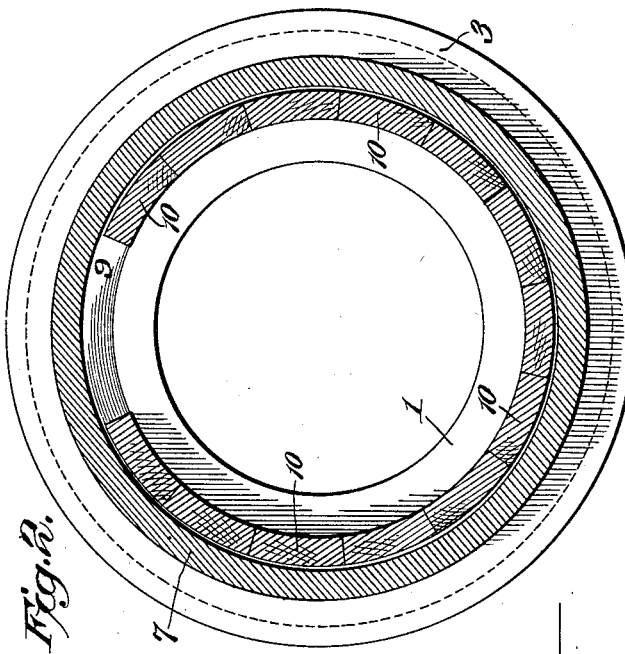
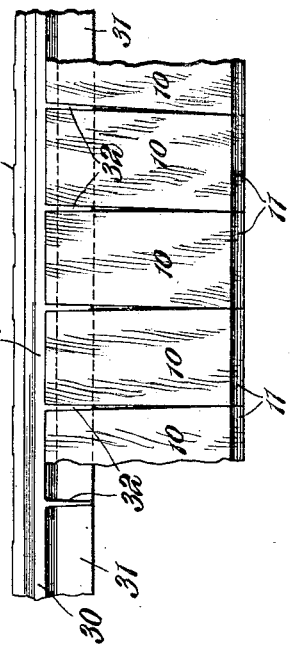
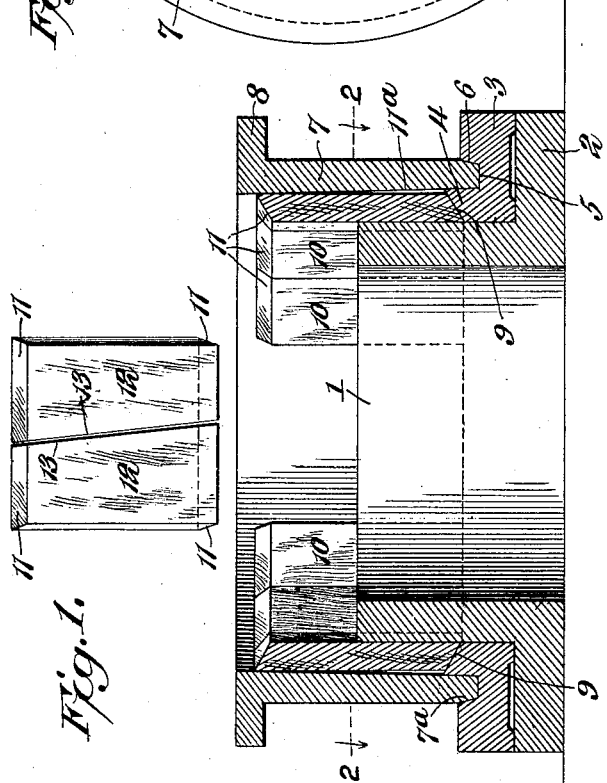
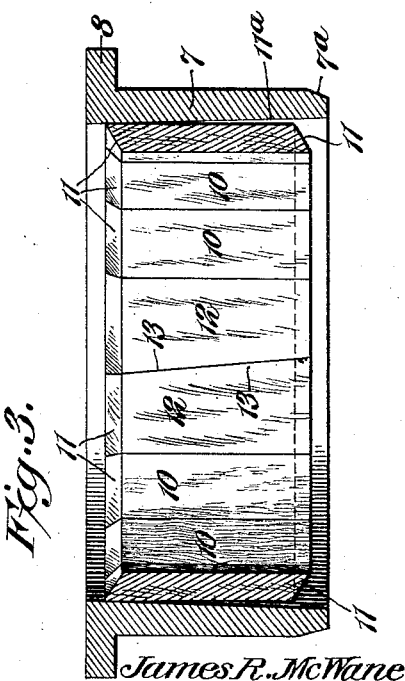
James R. McWane,
INVENTOR,
WITNESS
Howard D. Orr
ATTORNEY

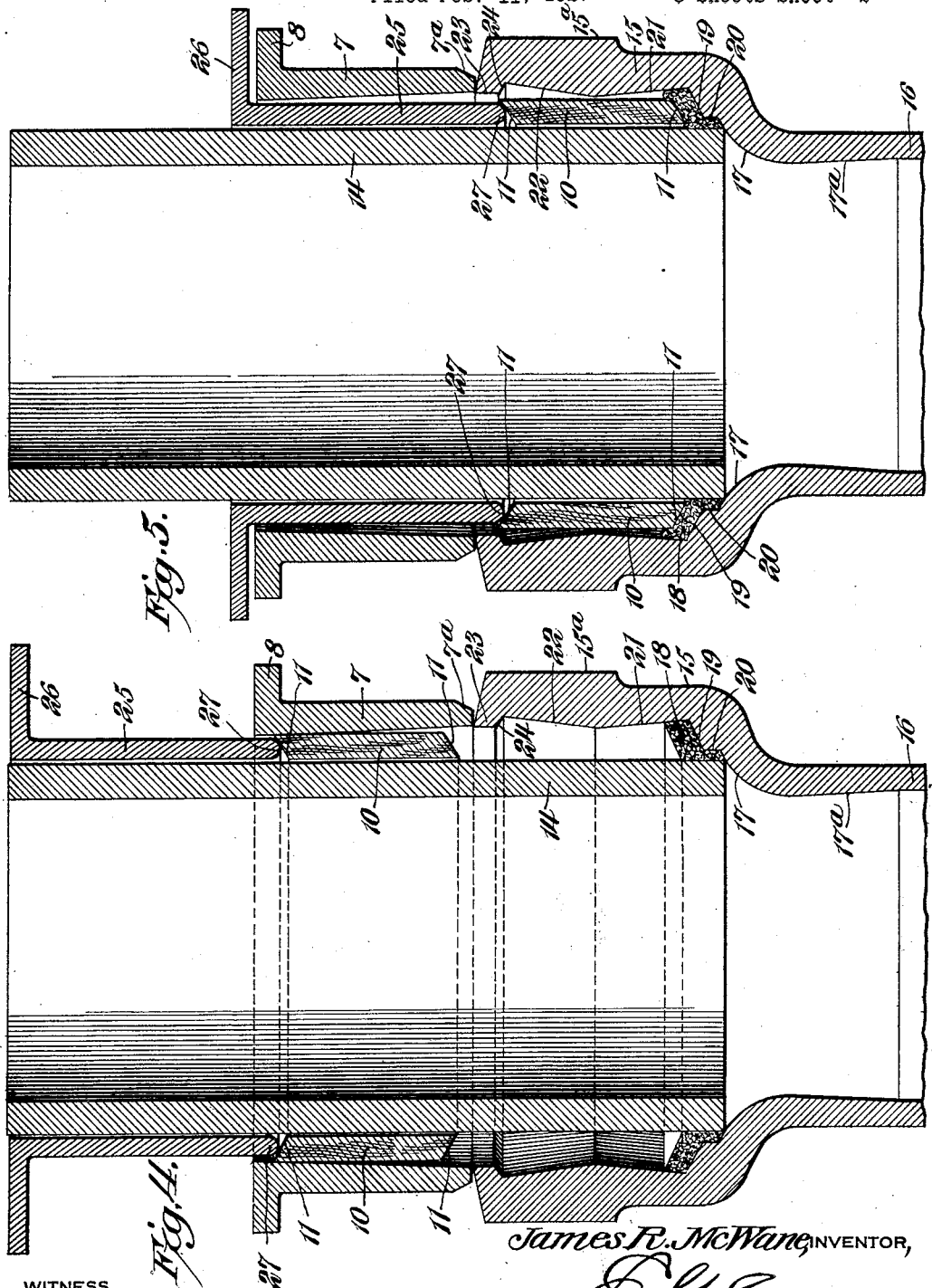

July 5, 1932. J. R. McWANE 1,866,051
METHOD OF AND APPARATUS FOR ASSEMBLING PIPE JOINT ELEMENTS
Filed Feb. 11, 1927 3 Sheets-Sheet 3
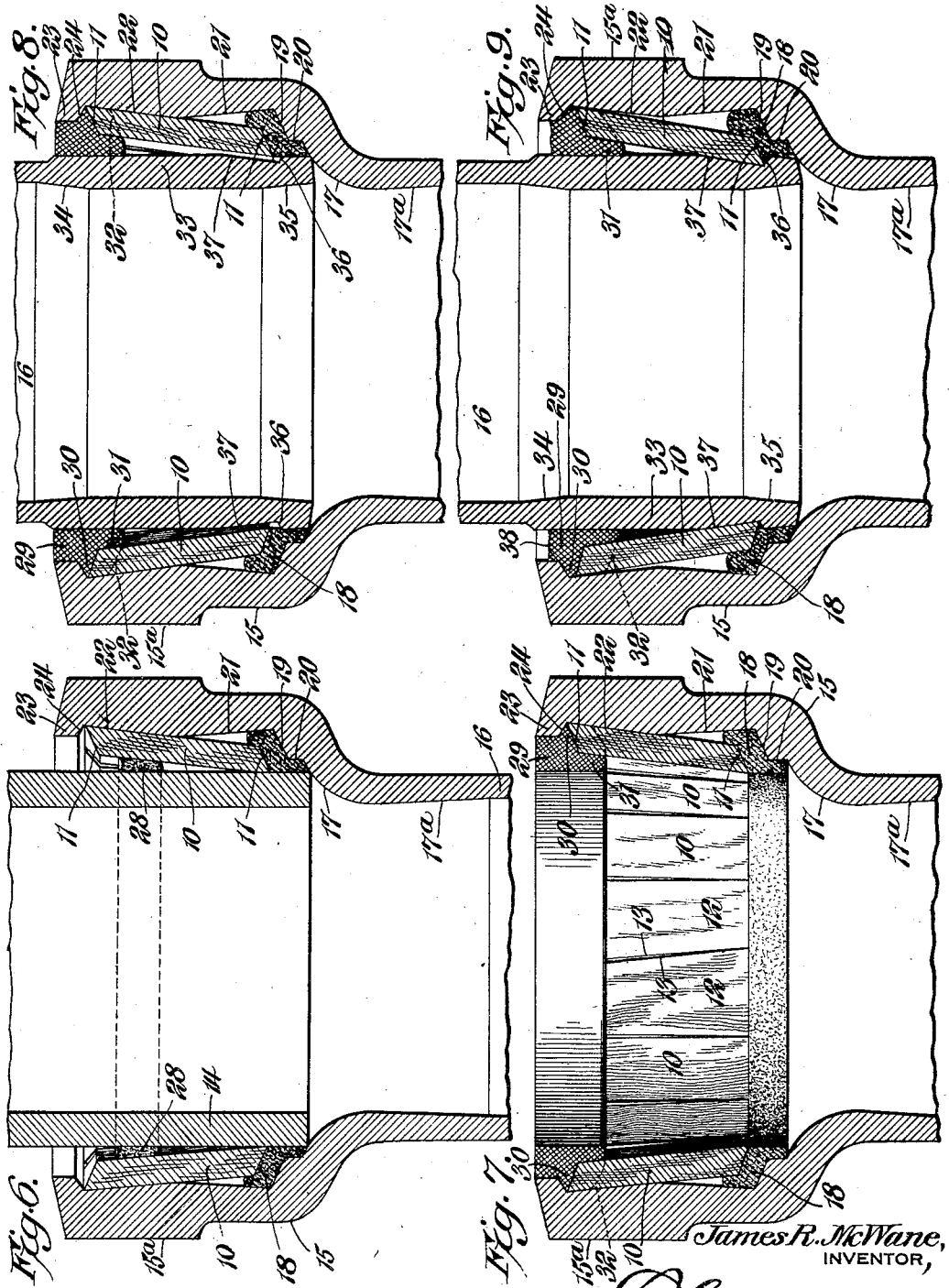
James R. McWane,
INVENTOR, Patented July 5, 1932

1,866,051

UNITED STATES PATENT OFFICE

JAMES R. McWANE, OF BIRMINGHAM, ALABAMA, ASSIGNOR TO McWANE CAST IRON PIPE COMPANY, OF BIRMINGHAM, ALABAMA, A CORPORATION OF ALABAMA

METHOD OF AND APPARATUS FOR ASSEMBLING PIPE JOINT ELEMENTS

Application filed February 11, 1927. Serial No. 167,509.

This invention relates to methods of and apparatus for making packed bell and spigot joints for metal pipes.

An object is to provide a joint of this character which may be easily, quickly and cheaply prepared at the factory and installed in the bell end of a cast iron or other metal pipe to be shipped to the field and assembled to form a pipe line, without the necessity of handling or pouring molten lead at the scene of operations.

The invention provides a preformed joint which may be readily installed in proper form, within the bell of the pipe, by unskilled labor, the elements making up the joint being of such nature as to enable the same to be assembled at a minimum cost and to effect a great saving in the amount of lead used therein.

The invention is designed as an improvement on the structure shown and described in my previous patents on pipe joints, Nos. 1,270,309; 1,288,092 and 1,486,777, the present arrangement and construction of the parts being calculated to simplify and cheapen the cost of production of joints of this character.

In the accompanying drawings, in which similar reference characters designate corresponding parts through the several figures:

Figure 1 is a diametric section illustrating the step of forming the ring of wooden blocks which forms part of the improved joint.

Figure 2 is a section taken on the line 2—2 of Figure 1.

Figure 3 is a diametric sectional view showing the ring of wooden blocks held in the forming ring.

Figure 4 is a diametric section showing the blocks in the forming ring which is applied to the mouth of a pipe bell, the blocks surrounding a mandrel, and about to be driven into position within the bell by a driving gland.

Figure 5 is a view similar to Figure 4, but showing the blocks driven by the driving gland within the bell.

Figure 6 is a diametric section through the bell and mandrel of Fig. 5, showing the means for forcing or tilting the upper ends of the blocks outwardly to lie behind the shoulder of the bell.

Figure 7 is a similar view but with the mandrel removed, showing the lead ring formed at the mouth of the bell.

Figure 8 is a diametric section showing the spigot end of an adjacent pipe in position within the bell ready for the final calking.

Figure 9 is a similar view showing the joint completed.

Figure 10 is a detail, displayed view showing the manner in which the lead engages and is held to the blocks.

Referring to the drawings, there is shown in Figure 1 a metal base which is preferably formed of cast iron and having a central, tubular, upstanding core 1 formed thereon, said core having an external diameter to accord with the particular size of pipe being handled. The core is provided, at its lower end, with an outstanding flange or base ring 2 to provide a solid and substantial base to prevent movement during operations, and also to provide a ledge for the reception of a ring or annulus 3. The ring or annulus is preferably formed of harder metal than the base and may be readily detached from the latter for the purpose of grinding or refacing or otherwise repairing the same when necessary; though it is obvious that the entire base may be formed of metal harder than cast iron, and may include said ring 3 in one integral structure.

The upper face of the annulus 3, where engaging the core 1, is provided with an upstanding, annular projection 4, somewhat higher than the face of the annulus, and immediately outside of this projection there is formed a depressed, circular seat 5 extending below the surface of the annulus. The outer wall 6 of the seat is tapered so as more readily to receive the lower beveled end of a forming and retaining ring 7 which, when seated in the seat 5, extends somewhat above the upper end of the core 1. At the upper end, the ring 7 is provided with an outstanding flange 8 to facilitate the handling of the same, and the lower end of said ring is beveled or tapered at 7a, to fit in seat 5.

The upper face of the projection 4 is inclined inwardly and downwardly entirely around the same to form an annular seat 9 between the core and the forming ring, after the latter is placed in position upon the base, as shown in Fig. 1. A series of wooden blocks 10 are placed in the space between the core and ring and upon the said seat 9, said blocks being previously cut to the proper shape and proportions to entirely fill the space and form a ring. The side edges of the blocks are preferably radially formed so that they may abut fairly and be clamped in a manner to be explained. The ends of the blocks are beveled, as shown at 11 (Fig. 3), the lower ends fitting the beveled seat 9, as clearly shown in Fig. 1.

The blocks are formed of some suitable wood, such as cypress, redwood or some other long-lived wood to withstand the action of the water or other liquid in the pipe line and each block is formed as described, except the two blocks last to be inserted into position. The last two blocks 12 are provided with oppositely inclined side edges 13 for coaction with each other to expand the ring when the last block, shown above and at the right in Fig. 1, is driven into position, Fig. 3.

The expansion thus brought to bear upon the blocks causes the same to forcibly bear at their upper ends against the inner wall 11ª of the forming ring 7, said wall being tapered as shown in Fig. 3, with the lower portion of greater diameter than the upper.

When the blocks are all tightly held within the forming ring, as in Fig. 3, the blocks are lifted from their seats on the base member and carried by the ring 7 to the pipe, as shown in Fig. 4. In order to install the wooden ring within the bell end of the pipe, a hollow, tubular mandrel 14 is utilized. This mandrel is first inserted into the bell 15 of the pipe 16 and is allowed to rest, in a central position, upon the inner rounded shoulder 17 at the bottom of the bell, the said mandrel extending considerably above the top edge of said bell.

Around the mandrel there is placed a ring 18 of jute or other fibrous packing or joint material, the same being rammed down by a suitable beveled-edge tool (not shown) to compact the same into a uniform layer upon the inclined seat 19 located just above the rounded shoulder 17 and connected to the same by a straight, longitudinal wall 20, said latter wall being of slightly greater diameter than the adjacent end of the mandrel. This ramming of the jute forces a quantity of the same into the space between the mandrel and the said wall 20, as shown in Fig. 4, and such projecting portion of the jute subsequently forms the first or inner sealing medium for the finished joint, as will be apparent.

The ramming tool is removed, leaving the upper surface of the jute inclined or beveled, as shown in Fig. 4, and the aforesaid forming ring 7 with the clamped ring of blocks 10 and 12 rigidly held therein is then placed around the mandrel and lowered until the said ring 7 rests upon the upper surface of the mouth end of the bell.

It will be noticed that the internal diameter of the ring 7 is substantially the same as the internal diameter of the mouth of the bell, so that the lower ends of the blocks may be driven down into the bell.

The inner wall of the bell is provided with opposite inclined portions 21 and 22, the portion 21 adjoining the beveled seat 19 and the portion 22 terminating short of the outer end of the bell, said outer end having an outer rib or shoulder 23 having its inner face beveled, as shown at 24.

A driving gland 25 is now placed around the upper, free end of the mandrel 14, said gland being freely slidable along the same, and is adapted to be driven or forced downwardly, as by a hydraulic press, to drive the blocks to the position shown in Fig. 5 with the lower beveled edges 11 resting upon the upper beveled face of the jute ring.

The driving gland 25 is provided with a radial flange 26 at its upper end which facilitates the driving and the handling of the same, and the lower end of the gland is rounded, as shown at 27, so that the same may force the blocks without damage to their beveled upper ends 11.

The length of the blocks is somewhat less than the distance between seat 19 and shoulder 17 (see Fig. 5), so that when the blocks are fully seated upon the inner layer of jute, the upper ends of the blocks are slightly below the rib or shoulder 23 and are free to be forced outwardly, in a radial direction, to lie beneath or behind the beveled face 24, in a manner to be explained.

With the blocks seated, as in Fig. 5, the gland and forming ring are removed, the mandrel being allowed to remain, and, as shown in Fig. 6, a ring 28 is placed around the mandrel and forced downwardly thereon to enter between the same and the wooden blocks to force the blocks outwardly by a wedging action. The ring 28 may consist of jute or other fibrous material or it may be a metal ring properly shaped to cause the necessary wedging action and to act as a dam, in connection with the upper ends of the blocks, for the molten lead which is now poured into the space at the mouth of the bell in the usual manner to form a lead ring 29 (Fig. 7). The lead flows behind the rib or shoulder 23 to form a locking flange 30 which effectually prevents the lead from being forced from the mouth of the bell.

A portion of the lead ring extends downwardly, as at 31, to embrace the ends of the blocks, and the said lead may also enter between the upper ends of adjacent wedges to form fins or webs 32 (see Fig. 10) which serve to prevent any substantial lateral or rotary movement of the several blocks.

The joint is now complete, except for the final calking in the field, and the mandrel may be readily removed in an obvious manner. The ring 28 may be picked to pieces and removed, if it is of jute, or may be split, if of metal, to facilitate removal. The joint is now ready for shipment. To prevent damage during shipment, the joint may have suitable protective means applied thereto, such as wooden blocks or the like, as in Patents 1,270,309 and 1,648,494, the protective means being removed when it is desired to complete the joint with the spigot of another section of pipe.

The spigot is somewhat greater in thickness than the body of the pipe 16, as shown at 33 in Figs. 8 and 9, said increased thickness being partly on the inside and partly on the outside of the pipe, as shown. The inner thickened portion is tapered off, as shown at 34 and 35 at the end of the spigot, while on the outside, the thickened portion is provided with a shoulder 36 formed near the end by an inclined wall 37 extending into the body of the spigot.

When the spigot is introduced into the bell to rest upon the rounded shoulder 17 of the latter, it will be noted, by reference to Fig. 8, that the inclined wall 37 of the spigot is substantially parallel with the aforesaid inclined wall 22 in the inner wall of the bell, and that the blocks, prior to the final calking (Fig. 8) lie flat against said wall 22 of the bell at an angle which locates the lower ends of the blocks flush with the inner circumferential edge of the inner layer of jute, and it will also be noted that the shoulder 36 on the spigot is somewhat below the lower or inner ends of the blocks.

After the final calking is completed in the field (Fig. 9), the lead is driven within the mouth of the bell, as shown at 38, thus driving the blocks downwardly and inwardly, causing more of the lead to enter behind the rib or shoulder 23 to straighten the locking means at this point, and causing the portion 31 to be extended farther down between the blocks and the outer face of the spigot. Furthermore, the fins or webs 32 are driven a greater distance in between the adjacent blocks to crowd them together tightly at their lower ends and to stop all leaks at the mouth of the bell.

As the blocks are thus forced, they are caused to tilt further by reason of their contact with the aforesaid inclined wall 22 of the bell and also by reason of the contact of their beveled lower ends with the aforesaid inclined upper surface of the inner ring 18 of tightly compacted jute, with the result that the said inner ring 18 is depressed tightly to hug the blocks, and the lower ends of the blocks are brought into actual engagement with the shoulder 36 of the spigot to prevent any relative longitudinal movement of the two sections of pipe. Also, the inner faces of the lower portions of the blocks are crowded into tight engagement with the inclined wall 37 of the spigot. This action on the blocks causes a crowding and tightening of all elements of the joint with the result that the likelihood of leakage is reduced to a minimum and especially when the blocks become water-soaked and further expanded.

The pipe joint herein described is claimed in a divisional application, filed June 7, 1932.

From the foregoing it will be seen that a preformed pipe joint has been provided which will effect a great saving by the utilization of wooden blocks which may be produced at a much less cost than serviceable wedges made of metal and have the further advantage of swelling to form a complete ring of wood to prevent leakage. It will also be seen that the blocks, by reason of their direct engagement at their inner ends with a shoulder on the spigot and at their outer ends with a shoulder in the bell, will effectually prevent longitudinal movement of the spigot within the bell when the pipe line is under pressure. It will be further seen that a great saving is effected by reason of the fact that with the arrangement of parts as in the present invention, but one layer of jute or other fibrous material is used for the inner seal, and considerably less lead is required to form the outer seal of the joint, as part of the space usually occupied by such lead rings at the mouth of the bell, is herein occupied by the upper ends of the blocks.

Obviously, the present invention is not restricted to the particular embodiment thereof herein shown and described. Moreover, it is not indispensable that all the features of the invention be used conjointly, since they may be employed advantageously in various combinations and sub-combinations. Furthermore, it will be evident that the method of the invention may be practiced with the aid of apparatus different from that shown and described.

What is claimed is:

1. Apparatus for assembling a series of wooden blocks prior to their introduction into the bell of a pipe comprising, in combination, a circular base member having an inner, annular, upstanding core and a ledge surrounding the core, a removable forming ring having inner tapered walls and adapted to be supported on the base surrounding the core, said blocks being placed in flanking relation to each other in the space between the core and ring, and means for expanding the blocks to frictionally engage the ring for removal from the base and introduction into the bell of a pipe.

2. Apparatus for assembling a series of wooden blocks prior to their introduction into the bell of a pipe, comprising, in combination, a circular base member having an inner, annular, upstanding core and a ledge surrounding the same, a ring or annulus adapted to rest on the ledge surrounding the core, said ring having an upper surface downwardly inclined toward the inner edge and having an annular channel outside of said upper surface, a removable forming ring having an upwardly-tapering inner wall and adapted to be seated in the channel of the ring in spaced relation to the core, the forming ring being frictionally engaged by the upper ends of the blocks.

3. Apparatus for assembling a circular series of blocks comprising, in combination, a circular base member having an inner, annular upstanding core and a ledge surrounding the same; a ring or annulus adapted to rest on the ledge surrounding the core, said ring having its upper surface inwardly bevelled at the inner edge and having an annular channel outside of said edge; a removable forming ring having an upwardly tapering inner wall and adapted to be seated in the channel of the ring spaced from the core.

4. Apparatus for assembling a circular series of wedges comprising, in combination, a circular base member having an inner, annular, upstanding core and a ledge surrounding the same, a ring or annulus adapted to rest on the ledge surrounding the core, said ring having its upper surface inwardly bevelled at the inner edge and having an annular channel spaced from said edge, a removable forming ring having an upwardly tapering inner wall and adapted to be seated in the channel of the ring in spaced relation to the core.

5. The method of making a preformed joint for pipes having bell and spigot ends provided with shoulders, which consists in forming a wooden ring from separate blocks within a forming ring, then forcing the ring of blocks as a unit into the bell end of the pipe until the blocks pass the shoulder at the mouth of the bell, then forming a malleable metal ring against the outer ends of the blocks and behind the shoulder to complete the preformed joint.

6. The method of making a pipe joint from pipes having bell and spigot ends provided with shoulders, which comprises seating a removable ring having a tapered inner wall upon a base in spaced relation to an unstanding core thereon, then placing a circular series of wooden blocks within said space, then placing a mandrel in the mouth of the bell to rest on the inner shoulder thereof, then calking material on said inner shoulder and around said mandrel, then removing the ring and blocks from said base and placing same over the mouth of the bell and around the mandrel, then forcing the blocks into the bell to contact with the material calked on the inner shoulder, then tilting the blocks outwardly at their upper ends to lie behind the outer shoulder of the bell, then pouring a ring of molten lead on the dam and blocks, said lead filling behind said outer shoulder and entering between the blocks, then removing the mandrel, then inserting the spigot of another pipe and further calking the lead to force the inner ends of the blocks into engagement with the shoulder on the spigot.

7. The method of making a pipe joint from pipes having bell and spigot ends provided with shoulders, which consists in seating a removable ring having a tapered inner wall upon a base in spaced relation to an upstanding core thereon, then placing a circular series of wooden blocks within said space, then placing a mandrel in the mouth of the bell to rest on the inner shoulder thereof, then calking material on said inner shoulder and around said mandrel, then removing the ring and blocks from said base and placing same over the mouth of the bell and around the mandrel, then forcing the blocks into the bell to contact with the material calked on the inner shoulder, then forcing a temporary ring between the mandrel and blocks to act as a dam and to tilt the blocks outwardly at their upper ends to lie behind the outer shoulder of the bell, then pouring a ring of molten lead on the dam and blocks, said lead filling behind said outer shoulder and entering between the blocks, then removing the mandrel, then inserting the spigot of another pipe and further calking the lead to force the inner ends of the blocks into engagement with the shoulder on the spigot.

8. Apparatus for assembling and facilitating the placing of a circular series of blocks in the bell of a pipe section comprising, in combination, a circular base member; a forming ring which removably fits over the circular base member with sufficient space therebetween to receive the blocks, and which has means to hold the blocks temporarily when assembled in a circular series; a mandrel whose outside diameter is such that it may be within the blocks when assembled on the forming ring; and a driving gland adapted to slide over the mandrel and to engage the outer ends of the blocks to free them from the forming ring, the latter being adapted to abut the end of the bell when the driving gland is used to drive the blocks into the bell.

9. Apparatus for assembling and facilitating the placing of a circular series of blocks in the bell of a pipe section comprising, in combination, a circular base member; a forming ring which removably fits over the circular base member with sufficient space therebetween to receive the blocks, and which has a tapering inner wall to hold the blocks when assembled in a circular series and driven uppositely to said taper; a mandrel whose outside diameter is such that it may be within the blocks when assembled on the forming ring; and a driving gland having a flange at one end adapted to slide over the mandrel and to engage the outer ends of the blocks to free them from the forming ring, the latter being adapted to abut the end of the bell when the driving gland is used to drive the blocks into the bell.

In testimony that I claim the foregoing as my own, I have hereto affixed my signature.

JAMES R. McWANE.